April 8, 1930.　　　　F. FRASER　　　　1,753,744
LAMINATED GLASS
Filed Aug. 23, 1926
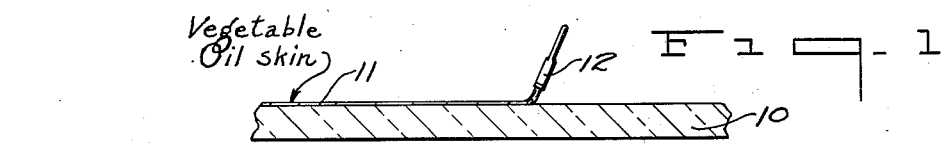
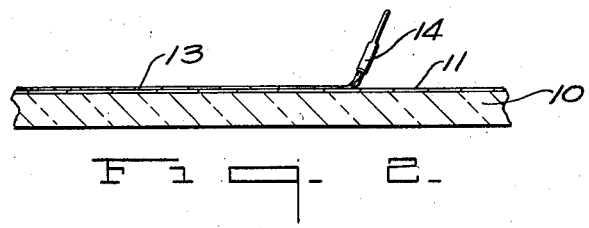
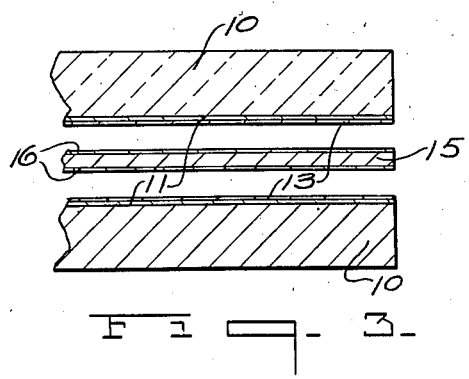
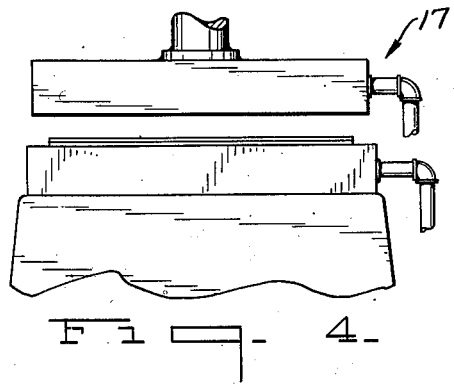
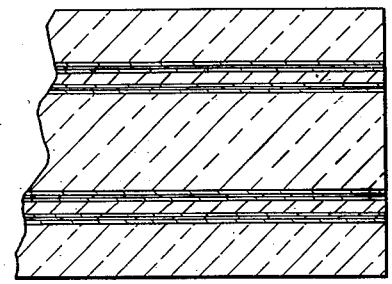
Inventor
Frank Fraser Patented Apr. 8, 1930

1,753,744

UNITED STATES PATENT OFFICE

FRANK FRASER, OF TOLEDO, OHIO, ASSIGNOR TO LIBBEY-OWENS GLASS COMPANY, OF TOLEDO, OHIO, A CORPORATION OF OHIO

LAMINATED GLASS

Application filed August 23, 1926. Serial No. 130,825.

The present invention relates to laminated glass.

An important object of the invention is to provide a process of producing, as a new article of manufacture, a sheet of laminated glass, and relates particularly to the formation of a skin on a sheet of glass to permit an efficient bond between a sheet of glass and a non-brittle sheet of material.

Another object of the invention is to provide, in the production of laminated glass, a process contemplating the formation of a skin on a sheet of glass consisting in applying a coating of vegetable oil solution to the surface of said sheet of glass and permitting the oil solution to dry, thus forming a skin thereon.

Another object of the invention is to provide the process wherein a skin formed from vegetable oil is deposited on a sheet of glass, after which the sheet of glass and a sheet of non-brittle sheet of material are united by preferably applying some suitable liquid between the two, and then subjecting the same to the action of heat and pressure.

Other objects and advantages of the invention will become apparent during the course of the following description.

In the drawings wherein like numerals are employed to designate like parts throughout the same, Fig. 1 is a sectional view illustrating diagrammatically the application of a vegetable oil such as linseed oil to a sheet of glass, Fig. 2 illustrates diagrammatically the application of some suitable liquid to the skin formed on said sheet of glass, Fig. 3 is a sectional view showing the laminations before they have been united, Fig. 4 is a diagrammatic representation of a form of press which may be used to unite the laminations, Fig. 5 is a sectional view of the finished product, and Fig. 6 is a similar view of another form of finished product.

In the production of laminated glass, a plurality of sheets of glass and a sheet of non-brittle material are united in a manner that the finished product will be more resistant to shock and breakage than ordinary glass of equal thickness, and also of a nature that even breakage of the glass will not cause a separation, as the non-brittle material will support and retain said fragments of glass. This type of glass is the ultimate aim in all cases, but due to difficulties in uniting the laminations with a transparent substance which will not deteriorate, the production of such glass has been somewhat uncertain heretofore.

In the present invention a sheet of glass and a sheet of non-brittle material are united by first forming a skin from some suitable vegetable oil on the glass, and then combining this skin with a sheet of non-brittle material using preferably a suitable film of liquid therebetween to assist in obtaining an intimate and efficient bond.

In Fig. 1, the numeral 10 designates a sheet of glass to which is applied a coating 11 by means of a brush or the like 12. The coating 11 in the present invention is some suitable vegetable oil such as cotton seed oil, linseed oil, castor oil, etc., the oil containing, if desired, a drier such as the japan drier, etc. The oil is applied and preferably permitted to dry so that a residue will remain in the form of a skin which will be tightly joined to the sheet of glass.

After the skin 11 has dried to the desired extent, a film of oil 13 is applied by the means 14. The film of oil may be any suitable liquid which can act as a solvent to the skin 11, or, if desired, the liquid may have a non-solvent action.

In Fig. 3, the numeral 15 represents a sheet of non-brittle material such as a cellulose composition material, and may include skins 16 similar to the skins 11 on the sheets of glass 10. The laminations are then interposed as illustrated and placed in a press 17 shown in Fig. 4, where they are subjected to the action of heat and pressure to join the sections together. The pressure is preferably initially applied centrally of the sheet to force out any excess fluid from between the laminations, thus giving a finished product 18, shown in Fig. 5, free of wet spots and other defects.

Fig. 6 illustrates a sheet of so-called bullet proof glass 19 which is relatively thicker and comprising more laminations than the regular sheet 18.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

Claims:

1. The process of producing laminated glass, consisting in forming a vegetables oil skin on a sheet of glass, and then uniting the same to a sheet of non-brittle material.

2. The process of producing laminated glass, consisting in applying a film of oil on a sheet of glass, allowing the film to dry to form a skin on said sheet of glass, and then uniting the same to a sheet of non-brittle material.

3. The process of producing laminated glass, consisting in applying a coating of vegetable oil on a sheet of glass, allowing the coating to dry to the desired degree to form a skin on said sheet of glass, and then uniting the same to a sheet of non-brittle material.

4. The process of producing laminated glass, consisting in applying a coating of a vegetable oil on a sheet of glass, permitting the oil to become set in a manner to form a skin on said sheet of glass, then applying a film of liquid on said skin, and then uniting the same to a sheet of non-brittle material.

5. The process of producing laminated glass, consisting in applying a coating of a vegetable oil on a sheet of glass, permitting the oil to become set in a manner to form a skin on said sheet of glass, then applying a film of oil to the skin, and then uniting the same to a sheet of non-brittle material.

6. As a new article of manufacture, a sheet of laminated glass including a sheet of glass having a vegetable oil skin thereon.

7. As a new article of manufacture, a sheet of laminated glass including a sheet of glass having an oil skin thereon.

8. As a new article of manufacture, a sheet of laminated glass comprising two sheets of glass, each having a vegetable oil skin thereon, and a sheet of non-brittle material interposed therebetween and united thereto.

Signed at Toledo, in the county of Lucas and State of Ohio, this 21st day of August, 1926.

FRANK FRASER.